United States Patent [19]

Arsem et al.

[11] 3,836,963

[45] Sept. 17, 1974

[54] TRANSISTOR OSCILLATOR-DETECTOR FOR PROXIMITY FUZES

[75] Inventors: Collins Arsem, Bethesda, Md.; Marshall M. Algor, Washington, D.C.

[73] Assignee: The United States of America as represented by the Secretary of the Army, Washington, D.C.

[22] Filed: Aug. 28, 1967

[21] Appl. No.: 665,197

[52] U.S. Cl. ....... 343/7 PF, 102/70.2 R, 102/70.2 P, 331/165, 343/13 R

[51] Int. Cl. ........................... F42c 13/04, G01s 9/04

[58] Field of Search ............ 343/13, 7 PF; 102/70.2, 102/70.2 P; 331/108, 165, 166

[56] References Cited

UNITED STATES PATENTS

| | | | |
|---|---|---|---|
| 2,913,716 | 11/1959 | Powell | 343/7 |
| 3,147,408 | 9/1964 | Yamamoto et al. | 331/108 X |
| 3,357,015 | 12/1967 | Wichmann | 343/13 X |

*Primary Examiner*—Malcolm F. Hubler

*Attorney, Agent, or Firm*—Edward J. Kelly; Herbert Berl; Saul Elbaum

[57] ABSTRACT

A transistor oscillator-detector for use as the transmitting oscillator and the detector of a received doppler signal in a radio proximity fuze is described. The oscillator is a transistor oscillator circuit in which the tank coil acts as both the oscillator tank inductance and as the antenna. One end of this inductor is connected both mechanically and electrically while the other end of the coil is mechanically free but electrically connected to the circuit by means of stray capacitances. In one embodiment the doppler signal is detected by a semiconductor diode loosely coupled to the oscillator by means of a grounded inductive loop. In another embodiment detection is accomplished by means of changes in voltages across an emitter resistance and these voltages changes are AC coupled to an output terminal. In the former embodiment the transistor oscillator-detector disclosed employs a PNP transistor and in the latter embodiment the transistor oscillator-detector employs a NPN transistor.

3 Claims, 5 Drawing Figures

PATENTED SEP 17 1974 3,836,963

SHEET 1 OF 2

INVENTORS
COLLINS ARSEM
MARSHALL M. ALGOR
Harry M. Saragovitz,
BY Edward J. Kelly,
Herbert Berl & J. D. Edgerton
ATTORNEYS INVENTORS
COLLINS ARSEM
MARSHALL M. ALGOR
BY Harry M. Saragovitz, Edward J. Kelly,
Herbert Berl & J. D. Edgerton
ATTORNEYS

TRANSISTOR OSCILLATOR-DETECTOR FOR PROXIMITY FUZES

BACKGROUND OF THE INVENTION

With the development of small munitions devices intended to function at a short distance from a target there is a continuing need for radio proximity fuze systems that can be accommodated therein. The small dimensional characteristics required of the fuzes used in this application necessitate the use of as few components as possible while maintaining adequate sensitivity and a broad tuning range. Conventional radiating structures cannot be used on such munitions, because of their size which would tend to impair the ballistic characteristics of the projectile, making it necessary to provide a novel and unique structure which, in addition to having the desired electrical characteristics, will have suitable small dimensions.

A principal area of development in the search for more compact radio proximity fuze systems for small munitions meeting the above criteria has been in the oscillator and detector circuits in the fuzes. It has been found to be desirable to combine these two circuit functions into a unitary circuit structure; however, presently available circuits of this nature have been found not be suitable for the application herein described. Prior art oscillator-detector circuits designed for use in radio proximity fuzes have not met the combined requirements of adequate sensitivity, compactness, uncomplicated construction, and broad tuning range.

It is therefore an object of this invention to provide a new small radio proximity fuze by means of a novel compact oscillator-detector circuit.

Another object of this invention is to provide a small oscillator-detector circuit using few components while maintaining adequate sensitivity and a broad tuning range.

Still another object of this invention is to provide an oscillator-detector circuit which will yield a suitable impedance transformation between a low impedance oscillator and a high impedance load.

A further object of this invention is to provide a transistor oscillator-detector of simple construction which can be made very rugged.

SUMMARY OF THE INVENTION

The aforementioned and other objects of this invention are obtained by utilizing an oscillator-detector circuit in which a transistor oscillator is used. The tank coil of the oscillator circuit is also used as the antenna with one end of the coil being both mechanically and electrically connected to the circuit while the other end is mechanically free but electrically connected to the circuit by stray capacitances. The received doppler signal is detected by means of a semiconductor diode loosely coupled to the oscillator by means of a single loop or by voltage changes across the emitter resistor of the transistor and coupling these voltage changes to an output terminal.

DESCRIPTION OF THE PREFERRED EMBODIMENTS

Figure 1:
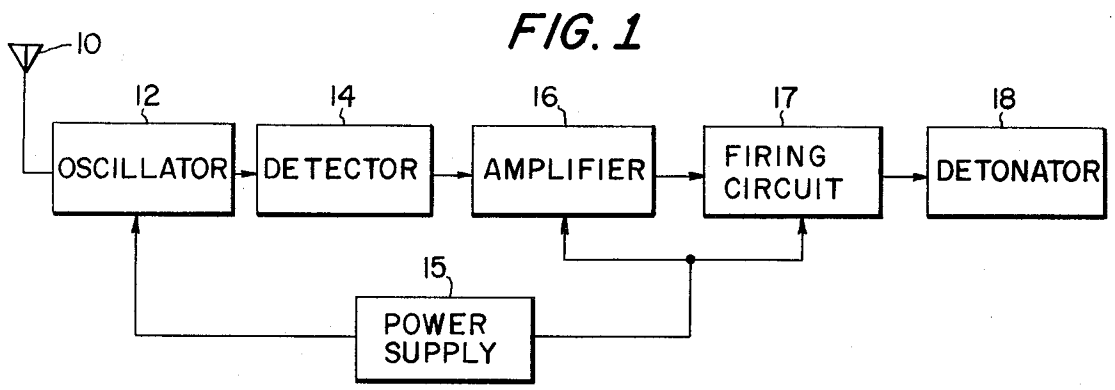
FIG. 1 is a block diagram of the radio proximity fuze system in which the transistor oscillator-detector of this invention is used.

FIG. 1 illustrates the transistorized doppler proximity fuze system, the development of which has been made possible by the transistor oscillator-detector of this invention. Antenna 10 is shown connected to oscillator 12 and, as will be described in greater detail below, the antenna is actually an external high Q self-resonant circuit serving as both the oscillator tank circuit and radiating element. Detector 14 is connected to receive the return doppler signal arriving through antenna 10 and oscillator 12. Amplifier 16 is connected to receive an amplified detected doppler 14 and this amplified signal is utilized by the firing circuit 17 to operate detonator 18. Power for the entire system is made available from power supply 15.

Figure 2:
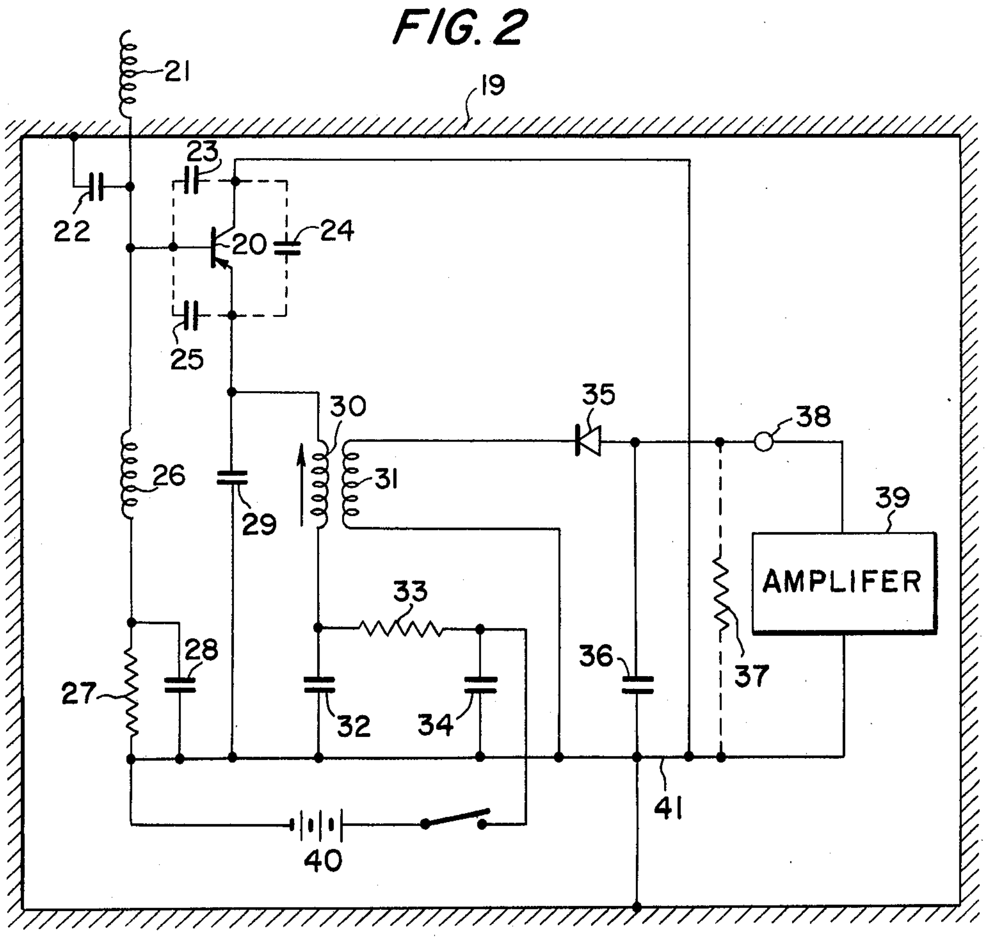
FIG. 2 is a schematic diagram of one embodiment of the transistor oscillator-detector of this invention employing a PNP transistor.

FIG. 2 is a schematic diagram of one embodiment of the transistor oscillator-detector of this invention employing a PNP transistor 20. Coil 21, as mentioned above, performs the dual role of tank inductor and antenna. For proximity fuze applications coil 21 is located outside the metallic part of the munition body 19 and capacitor 22 is the capacitance of the feed-thru device used to make connection through the munition wall 19. The base of transistor 20 is connected through a RF choke 26 and bias resistor 27 to power supply 40. Capacitors 28, 32, 34 and 36 are RF bypass capacitors. The collector of transistor 20 is connected directly to common lead 41. The emitter of transistor 20 is connected through an adjustable inductor 30, which is used to adjust the feedback of the oscillator circuit, and RF bypass capacitor 32 to the common 41. Emitter bias is provided from power supply 40 through bias resistor 33. Capacitor 23 is the inter-electrode capacitance between the base and collector of transistor 20; capacitor 25 is the inter-electrode capacitance between the base and emitter of transistor 20 and capacitor 24 is the inter-electrode capacitance between the collector and emitter of transistor 20. While the interelectrode reactances are shown herein as being capacitive it is well known that these reactances will vary with frequency and might well be inductive depending on the frequency of operation of the circuit. Coil 31 is an inductor that is magnetically coupled to coil 30 to form a transformer to couple out part of the RF energy in coil 30 to be detected by a diode 35.

Changes in the RF loading of antenna 21 will produce changes in the DC voltage at the output terminal 38 connected to diode 35. For proximity fuze applications the output terminal 38 is the point at which the doppler voltage is obtained. In this embodiment the quiescent voltage at terminal 38 is used to provide DC voltage for the first stage of an amplifier 39 used to amplify the doppler voltage. If desired, the amplifier, or other load, 39 can be AC coupled to terminal 38 provided a suitable resistor 37 is introduced to provide a discharge path for bypass capacitor 36.

A parallel circuit consisting of adjustable inductor 30 and capacitor 29 together with interelectrode capacitance 24 provides a means by which the feedback of the oscillator may be varied to obtain an optimum combination of sensitivity and power output. The inductor 30 should be designed to have low stray capacitance and a suitably high Q.

Figure 3:
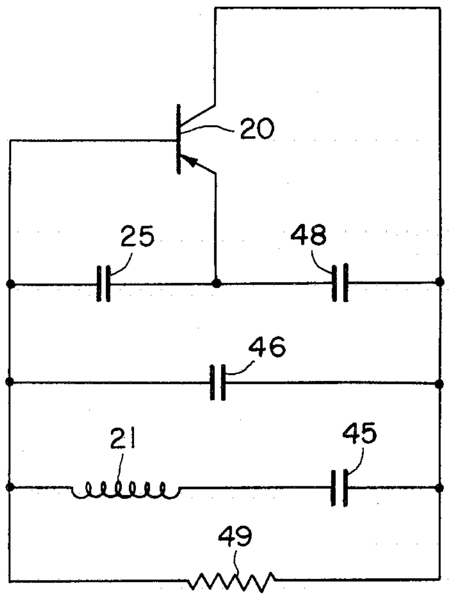
FIG. 3 is a schematic diagram of the RF equivalent circuit of the embodiment of FIG. 2.

FIG. 3 is an RF equivalent circuit for the embodiment of FIG. 2 in which like numbers refer to like elements in FIG. 2. It will be apparent to those skilled in the art that a description of a RF equivalent circuit may be accurate only under certain circumstances such as a particular operating frequency. Therefore the circuits herein described may vary somewhat depending on the desired operating characteristics. Capacitor 48 represents the parallel combination of capacitors 24, 29, and adjustable inductor 30 in FIG. 2. Capacitor 46 connected across the series combination of capacitors 25, and 48 represents the parallel combination of capacitor 22, capacitor 23 and inductance 26 of FIG. 2. The series combination of the inductance of antenna 21 and capacitor 45 are connected across the aforementioned parallel combination. Capacitor 45 represents the stray capacitance between antenna 21 and an artificial ground which in this case is munition body 19. Resistor 49 is connected across coil 21 and capacitor 45 and is the equivalent radiation resistance referred to the base-collector terminals of transistor 20.

Figure 4:
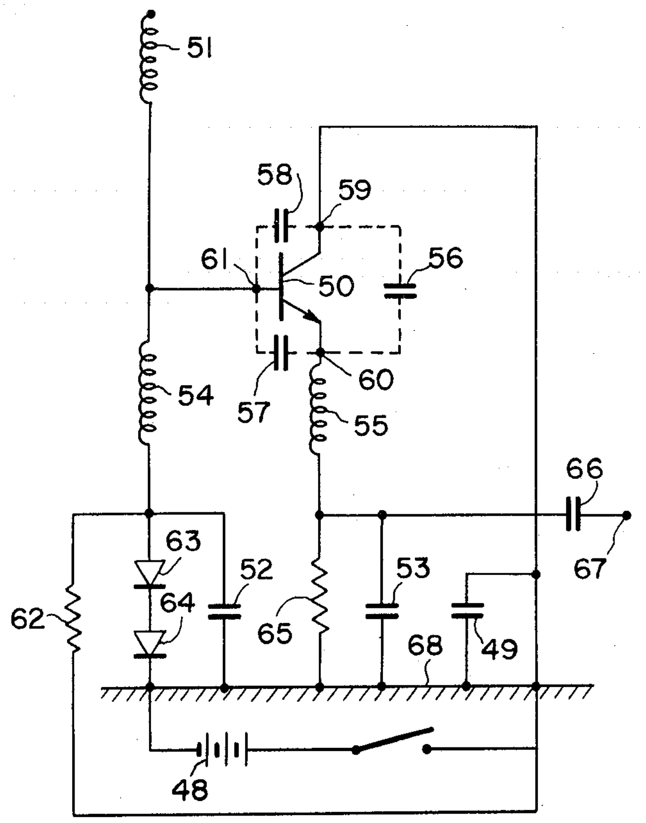
FIG. 4 is an alternate embodiment of the transistor oscillator-detector of this invention employing an NPN transistor.

FIG. 4 is the schematic diagram of an alternate embodiment of the transistor oscillator-detector of this invention for proximity fuzes employing NPN transistor 50. As before, coil 51 acts as the oscillator tank inductor and as the antenna. Capacitors 49, 52 and 53 are RF bypass capacitors. The collector of transistor 50 is connected directly to an artificial ground 68 which in a case of the proximity fuze application will be the munition body. Capacitor 56 is the interelectrode capacitance between the collector and the emitter of transistor 50. Capacitor 57 is the interelectrode capacitance between the emitter 60 and base 61 of transistor 50 and capacitor 58 is the inter-electrode capacitance between the base 61 and the collector 59 of transistor 50. DC bias for the base 61 of transistor 50 is obtained from a power supply 48 and regulated by means of a resistor 62 in parallel with the series combination of a power supply 48 and diodes 63 and 64 which are series connected in a forward bias configuration. The base 61 is biased at a voltage equal to the sum of the saturation voltages of the two diodes 63 and 64. The emitter 60 of transistor 50 is connected to arificial ground 68 through RF choke 55. Bias resistor 65 provides limiting for the DC emitter current. Changes in the RF loading of antenna 51 caused by the doppler return signal will produce changes in the emitter current and thus changes in the voltage across the emitter resistor 65. The voltages changes across emitter resistor 65 are AC coupled by means of a capacitor 66 to an output terminal 67. For proximity fuze applications the output terminal 67 is the point at which the doppler voltage is obtained.

Figure 5:
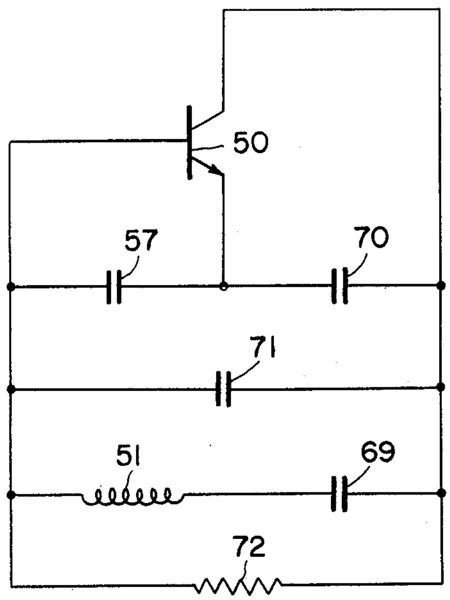
FIG. 5 is a schematic diagram of the RF equivalent circuit of the embodiment shown in FIG. 4.

FIG. 5 is the RF equivalent circuit for the embodiment of FIG. 4. Transistor 50 capacitor 57 and coil 51 are defined in FIG. 4. Capacitor 70 is the parallel combination of RF choke 55 and the collector emitter interelectrode capacitance 56. Capacitor 71 which is connected in parallel across the series combination of capacitors 57 and 70 represents the parallel combination of RF choke 54 and the base-collector interelectrode capacitance 58. The series combination of coil 51 and capacitor 69 are connected in parallel across capacitor 71. Capacitor 69 represents the stray capacitance between antenna 51 and artificial ground 68. Resistor 72 connected in parallel across the series combination of coil 51 and capacitor 69 is the equivalent radiation resistance of the antenna referred to the base-collector terminal of transistor 50.

Although, as is readily apparent, the embodiments of FIG. 2 and FIG. 4 differ greatly in details of transistor type, DC biasing methods, and signal pickoff. It can be seen from the RF equivalent circuits of FIGS. 3 and 5 that with respect to the processing of radio frequency signals the circuits are fundamentally the same.

With the advent of this unique transistor oscillator-detector circuit for use in proximity fuzes such systems may now be utilized in the small munitions described above. The operating frequency, tank inductance, stray capacitance between antenna and ground and the equivalent radiation resistance referred to the base-collector terminals of the transistor may all simultaneously and easily be varied by changing the number of turns of the single coil used as both antenna and tank inductor. Oscillator over a five-to-one frequency range in the UHF band may be obtained by this means. By taking turns off of the aforementioned coil the frequency of oscillation will be raised while at the same time lowering impedance of the coil to provide an optimum impedance match between the coil and the transistor. For any given size missile on which a fuze incorporating the transistor oscillator-detector of our invention is used as the number of coil turns decreases and the frequency of oscillation increases, the impedance seen by the transistor decreases. Construction of such radio frequency proximity fuze systems has been greatly simplified by the absence of a mechanical connection to the free end of the antenna coil.

Although the embodiments of this invention described above have been described in the context of their use in proximity fuze systems, it will be apparent to those skilled in the art that this transistor oscillator-detector may be readily utilized in a myriad of other types of electronic systems. It will further be apparent to those skilled in the art that the embodiments shown are only exemplary and that various modifications can be made in construction and arrangement within the scope of the invention as defined in the appended claims.

The invention claimed is:

1. A transistor oscillator-detector comprising:

a. a transistor oscillator having a tank circuit;

b. said tank circuit comprising the parallel combination of an inductor and a capacitor, said inductor, being the antenna for said oscillator-detector, having one end connected mechanically and electrically to one end of said capacitor and to said transistor oscillator and having an other end mechanically free but electrically connected to an other end of said capacitor and to said transistor oscillator;

c. a detecting means connecting said transistor oscillator to said output terminals.

2. The transistor oscillator-detector of claim 1 in which said oscillator is of the common collector configuration.

3. In a radio proximity fuze a transistor oscillator-detector comprising:

a. an artificial ground;

b. a PNP transistor having a base, a collector and emitter with said collector being connected to said artificial ground;

c. a tank circuit connected between the base of said transistor and artificial ground comprising a first inductor connected in series with a first capacitor which capacitor is the stray capacitance between said first inductor and said artificial ground, said first inductor, being the antenna for said oscillator-detector, having one end connected mechanically and electrically to said base of said transistor and having an other end mechanically free but electrically connected to said artificial ground by said first capacitor;

d. a feedback path between the emitter and common collector terminals comprising the residual reactance between said terminals and an impedance means for providing a dc path between said terminals and for permitting oscillation;

e. a third inductor magnetically coupled to said second conductor;

f. a detecting means connected to receive the output of said inductor;

g. a pair of output terminals connected to receive the output of said detecting means.

* * * * *